United States Patent [19]

Banta et al.

[11] 4,247,388

[45] Jan. 27, 1981

[54] HYDRODEWAXING CATALYST PERFORMANCE

[75] Inventors: Frederick Banta, Elmer; Henry R. Ireland, Woodbury; Thomas R. Stein, Cherry Hill; Robert C. Wilson, Jr., Woodbury, all of N.J.

[73] Assignee: Mobil Oil Corporation, Fairfax, Va.

[21] Appl. No.: 52,718

[22] Filed: Jun. 27, 1979

[51] Int. Cl.$^3$ .................. C10G 35/095; C10G 45/54; C10G 47/20

[52] U.S. Cl. .............................. 208/111; 208/52 CT; 252/420

[58] Field of Search .................. 208/111, 307, 52 CT, 208/264; 252/420

[56] References Cited

U.S. PATENT DOCUMENTS

| 3,508,867 | 4/1970 | Frilette et al. | 252/455 Z |
|---|---|---|---|
| 3,700,585 | 10/1972 | Chen et al. | 208/111 |
| 3,702,886 | 11/1972 | Argaver et al. | 423/328 |
| 3,755,145 | 8/1973 | Orkin | 208/111 |
| 3,804,746 | 4/1974 | Chu | 208/111 |
| 3,890,218 | 6/1975 | Morrison | 208/135 |
| 3,899,544 | 8/1975 | Chang et al. | 585/408 |
| 3,956,102 | 5/1976 | Chen et al. | 208/93 |
| 4,053,532 | 10/1977 | Ireland et al. | 208/111 X |
| 4,098,678 | 7/1978 | Schwarzenbek | 208/120 |

*Primary Examiner*—Herbert Levine
*Assistant Examiner*—G. E. Schmitkons
*Attorney, Agent, or Firm*—Charles A. Huggett; Charles J. Speciale

[57] ABSTRACT

A method is disclosed for the improvement of catalyst performance in catalytic hydrodewaxing of both petroleum and synthetic hydrocarbon feedstocks utilizing a special group of acidic crystalline aluminosilicate zeolites such as those of the ZSM-5 type which involves treatment of said zeolites in order to adjust their initially high alpha activity to within a range of 55–150 alpha prior to use as catalysts in a hydrodewaxing operation.

26 Claims, 3 Drawing Figures

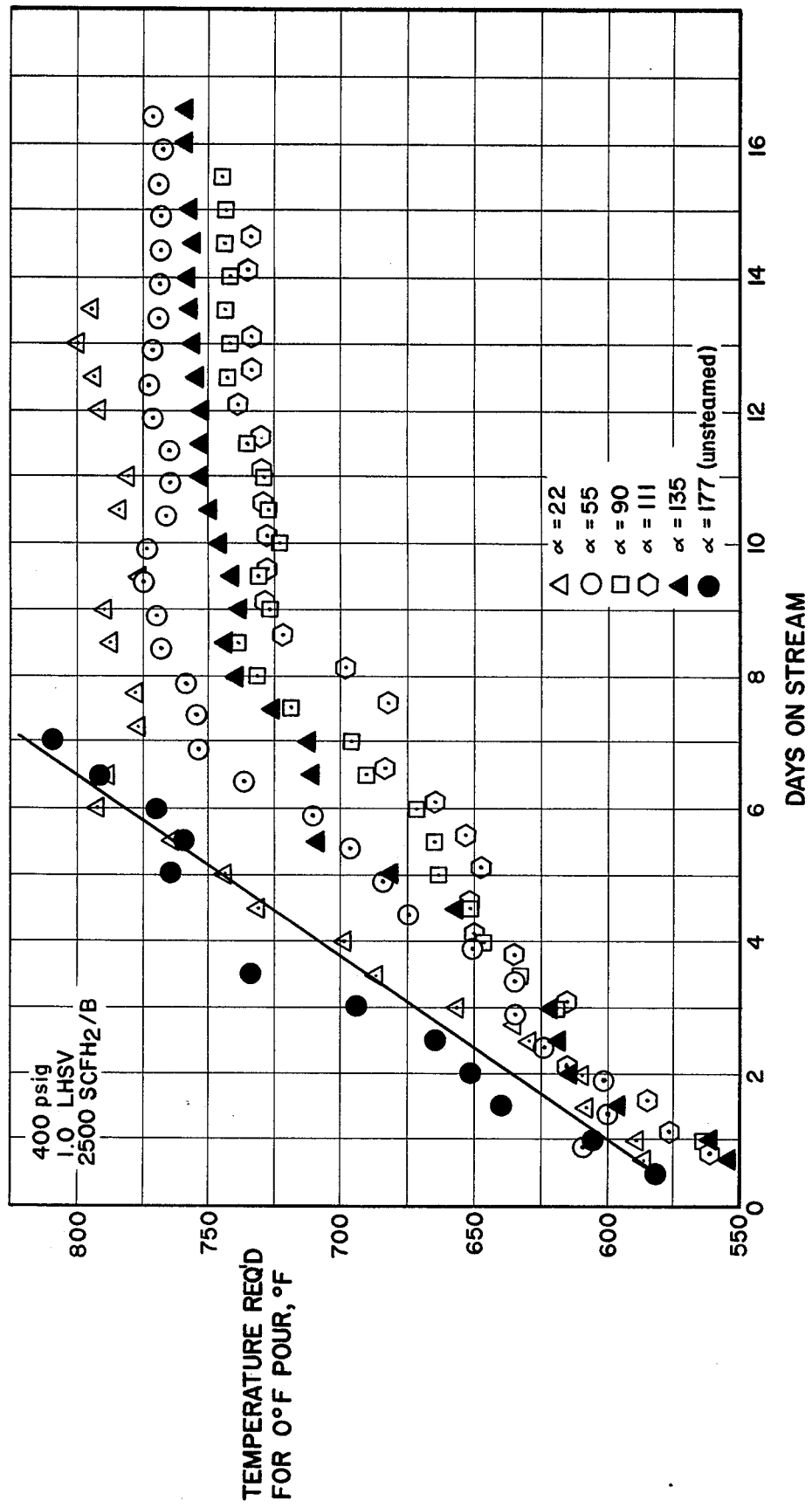

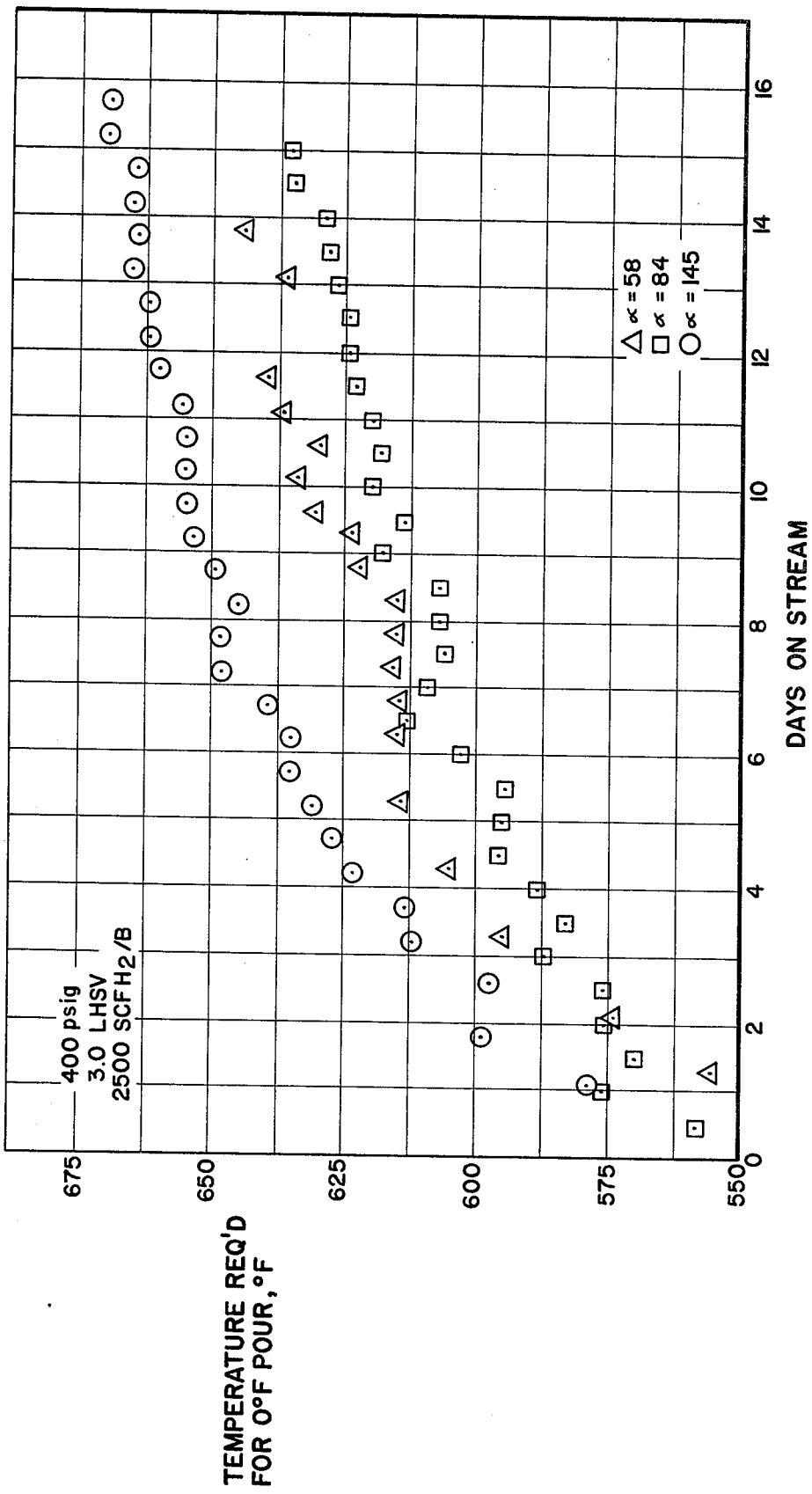

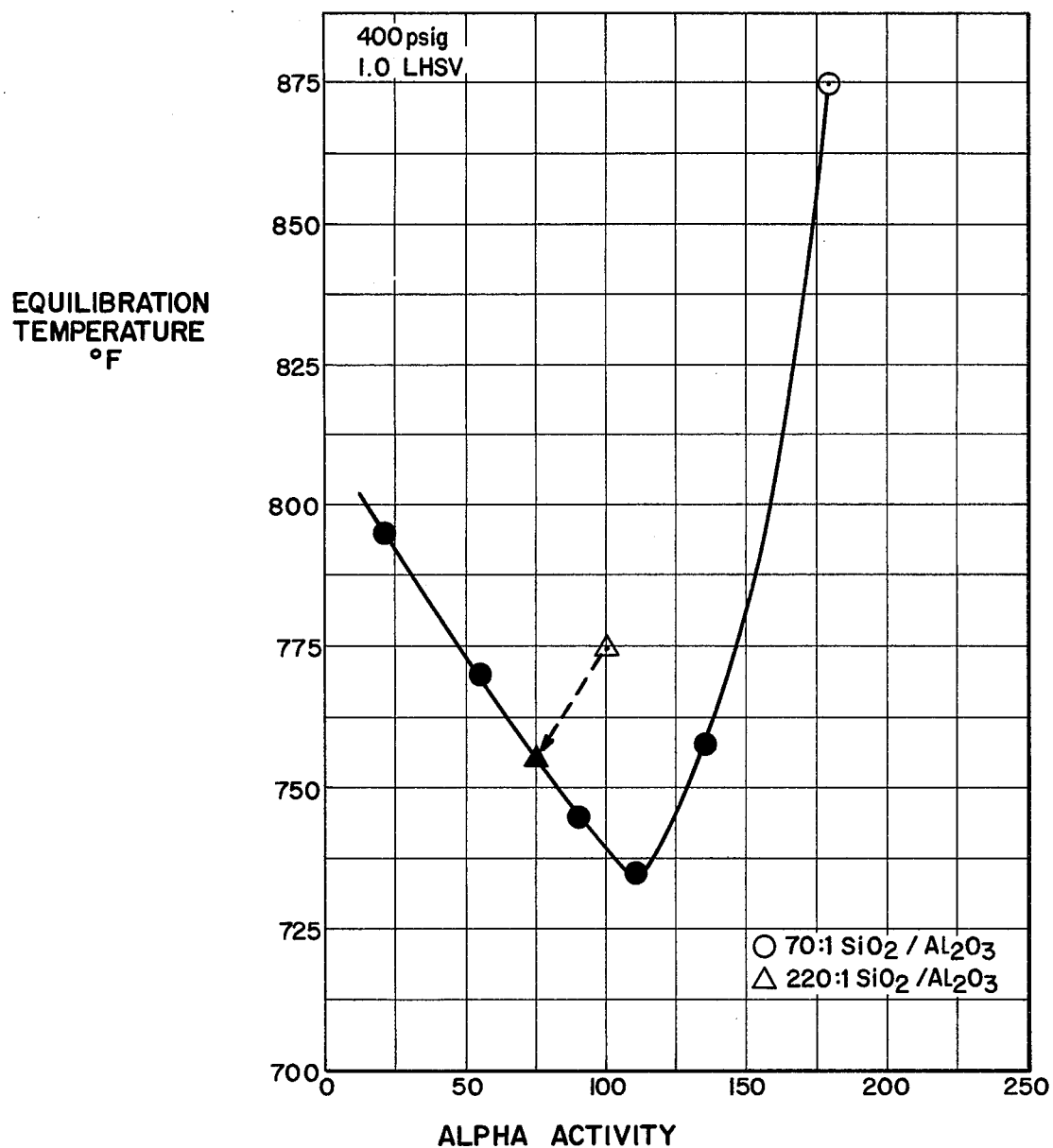

HYDRODEWAXING CATALYST PERFORMANCE

BACKGROUND OF THE INVENTION

1. Field of the Invention

This invention relates to a novel catalytic hydrodewaxing process utilizing an acidic crystalline zeolitic material of a special group such as ZSM-5 which has had its properties enhanced by controlling its alpha activity to a certain specified range prior to its use in hydrodewaxing operations.

2. Description of the Prior Art

Hydrocarbon conversion processes utilizing crystalline aluminosilicate zeolites have been the subject of extensive investigation as is obvious in both the patent and scientific literature. Catalytic hydrodewaxing operations utilizing ZSM-5 type zeolites are also known in the art and it is also generally known that the performance of these zeolites will be enhanced by treatment of the same with steam. In this connection, U.S. Pat. No. 3,700,585 discloses and claims a hydrodewaxing operation utilizing ZSM-5 type zeolites and at column 8, lines 6 and following, points out that catalysts of improved selectivity and having other beneficial properties in some hydrocarbon conversion processes, such as catalytic cracking are obtained by subjecting the zeolite to treatment with steam at elevated temperatures ranging from about 800° F. to 1500° F. and preferably 1000° F. and 1400° F. This patent does not contain any specific examples of steaming a ZSM-5 type zeolite and the subsequent use thereof in hydrodewaxing operations.

U.S. Pat. No. 4,053,532 is directed towards a hydrodewaxing operation involving a Fischer-Tropsch synthesis product utilizing ZSM-5 type zeolites. However, at column 11, lines 20 and following, it is disclosed that a further improvement can be realized in the Fischer-Tropsch operation or in hydrodewaxing a heavy gas oil stream with a ZSM-5 class of crystalline zeolites with respect to catalyst aging rate if the catalyst is preconditioned with a hydrogen/steam mixture.

U.S. Pat. No. 3,755,145 is directed towards lube oil hydrocracking with ZSM-5 type zeolites utilizing a mixture of ZSM-5 containing a hydrogenation component and another zeolite. This patent discloses at column 5, that steaming of the catalyst mixture is beneficial.

U.S. Pat. No. 3,956,102 is concerned with a process involving the hydrodewaxing of petroleum distillates utilizing a ZSM-5 -type zeolite catalyst. This patent does not contain any specific disclosure of steaming of ZSM-5 type zeolites but it does refer to previously mentioned U.S. Pat. No. 3,700,585 at column 1, lines 66 and following.

SUMMARY OF THE INVENTION

It has now been discovered that the catalytic performance of certain acidic zeolites can be improved by controlling their alpha activity to within the range of 55–150. In other words, this invention is directed towards an improvement in connection with the known technique of using acidic zeolites such as those of the ZSM-5 type in hydrodewaxing operations and it resides in modifying said zeolites in order to obtain a critical range of alpha values.

BRIEF DESCRIPTION OF THE DRAWINGS

FIG. 1 represents a graph which shows the aging rates of five steamed catalysts of varying alpha values for hydrodewaxing of a Nigerian Gas Oil to 0° F. pour point.

FIG. 2 shows the aging rates for three steamed catalysts for hydrodewaxing Arabian Light Gas Oil to 0° F. pour point.

FIG. 3 shows a plot of the alpha values of steamed nickel hydrogen exchanged ZSM-5 versus equilibration temperature.

DESCRIPTION OF SPECIFIC EMBODIMENTS

It has been discovered that the catalytic performance of certain acidic zeolites can be improved by controlling their alpha activity to a range of within 55–150 alpha, with 80–135 being even more desirable and alpha values of 90–120 being the most desirable. Although it had been previously known that steaming might be beneficial in enhancing the catalytic performance of certain zeolites in hydrodewaxing operations, nevertheless, this invention represents an improvement over the previously known state of the art in that applicants have discovered that there is a critical range of alpha values wherein catalytic performance can be optimized for hydrodewaxing operations.

Methods of enhancing the catalytic properties of the special class of zeolites by controlling alpha activity include reducing the initial alpha activity by such techniques as partial coking, partial base exchange with basic cations such as sodium, dilution with a matrix or preferably by treatment with steam. Another technique for controlling alpha activity is by manipulation of the silica to alumina ratio of said zeolites to certain ranges. The desired silica to alumina ratio can be obtained either by synthesizing the zeolite so that it initially has the proper silica to alumina ratio or a zeolite having too high an alumina content, i.e. a low silica to alumina ratio, can be treated with well known alumina removing materials such as strong mineral acids to achieve the proper ratio. It is also within the scope of this invention to use more than one of the above techniques to control the alpha activity.

Alpha values or alpha activity is a measure of normal hexane cracking conversion relative to a silica-alumina cracking catalyst and the alpha test is described in a Letter to the Editor entitled "Superactive Crystalline Aluminosilicate Hydrocarbon Cracking Catalyst" by P. B. Weisz and J. N. Miale, Journal of Catalysis, Vol. 4, No. 4, August 1965, pages 527–529, said article being herein incorporated by reference.

The catalyst used in the method described herein comprises a crystalline aluminosilicate zeolite which is a member of a novel class of zeolites exhibiting some unusual properties. These zeolites induce profound transformation of aliphatic hydrocarbons to aromatic hydrocarbons in commercially desirable yields and are generally highly effective in conversion reactions involving aromatic hydrocarbons. Although they have unusually low alumina contents, i.e. high silica to alumina ratios, they are very active even when the silica to alumina ratio exceeds 30. The activity is surprising since catalytic activity is generally attributed to framework aluminum atoms and cations associated with these aluminum atoms. These zeolites retain their crystallinity for long periods in spite of the presence of steam at high temperature which induces irreversible collapse of the framework of other zeolites, e.g., of the X and A type.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can ben conceived, due to pore blockage or other cause, that may be operative.

Rather than attempt to judge from crystal structure whether or not a zeolite possesses the necessary constrained access, a simple determination of the "constraint index" may be made by passing, continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at a 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| CAS | C.I. |
| --- | --- |
| ZSM-5 | 8.3 |
| ZSM-11 | 8.7 |
| ZSM-12 | 2 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination; with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina ratio. In those instances, a temperature of up to about 1000° F. and a liquid hourly space velocity of less than one, such as 0.1 or less, can be employed in order to achieve a minimum total conversion of about 10%.

The class of zeolites defined herein is exemplified by ZSM-5, ZSM-11, ZSM-12, ZSM-35 and ZSM-38 and other similar materials. U.S. Pat. No. 3,702,886 describing and claiming ZSM-5 is incorporated herein by reference.

ZSM-11 is more particularly described in U.S. Pat. No. 3,709,979, the entire contents of which is incorporated herein by reference.

ZSM-12 is more particularly described in U.S. Pat. No. 3,832,449, the entire contents of which is incorporated herein by reference.

ZSM-35 is more particularly described in U.S. Pat. No. 4,016,245, the entire contents of which is incorporated herein by reference.

ZSM-38 is more particularly described in U.S. Pat. No. 4,046,859, the entire contents of which is incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cation in the forming solution may not be absolutely essential to the formation of this type zeolite; however, the presence of these cations does appear to favor the formation of this special type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-38 and ZSM-35, with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index, as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 100 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that unusual sustained activity and stability of this class of zeolites is associated with its high crystal anionic framework density of not less than about 1.6 grams per cubic centimeter. This high density, of course, must be associated with a relative small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilite | .34 | 1.71 |
| Laumontile | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The crystal size of the synthesized zeolite is generally within the approximate range of 0.01 to 40 microns.

The zeolites used in the instant invention can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese and calcium.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. Pat. No. 3,140,249; U.S. Pat. No. 3,140,251; and U.S. Pat. No. 3,140,253.

Following contact with the salt solution of the desired replacing cation, the zeolites are then preferably washed with water and dried at a temperature ranging from 150° F. to about 600° F. and thereafter calcined in air or an inert gas at temperatures ranging from about 500° F. to 1500° F. for periods of time ranging from 1 to 48 hours or more.

Although not required for successful operation, the zeolites can also be used in intimate combination with a hydrogenating component such as tungsten, vanadium, molybdenum, rhenium, nickel, cobalt, chromium, manganese, or a noble metal such as platinum or palladium. Such component can be exchanged into the composition, impregnated therein or physically intimately admixed therewith. Such component can be impregnated in or onto zeolite such as, for example, by, in the case of platinum, treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metal is in the form of a cation or cationic complex, e.g., $Pt(NH_3)_4Cl_2$ is particularly useful. It is to be understood that the presence of a hydrogenating component is not required and is optional.

Prior to use, the zeolites should be dehydrated at least partially. This can be done by heating to a temperature in the range of 200° to 600° C. in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

As has heretofore been pointed out, the novel process of this invention is concerned with hydrodewaxing of hydrocarbon feedstocks including petroleum as well as synthetic hydrocarbon feedstocks such as those resulting from the conversion of synthesis gas. The term "hydrodewaxing" as used in the specification and claims is used in its broadest sense and is intended to mean the removal of those hydrocarbons which readily solidify (waxes) from hydrocarbon stocks. Hydrocarbon feeds which can be treated include lubricating oil stocks as well as those which have a freeze point or pour point problem, i.e. stocks boiling above about 350° F. such as whole crude, distillates, bright stock, etc.

Hydrodewaxing conditions include temperatures between 500° F. and 1000° F., a pressure between 100 and 3000 psig but preferably between 200 and 700 psig. The liquid hourly space velocity is generally between 0.1 and 10, preferably between 0.5 and 4 and the hydrogen to hydrocarbon mole ratio is generally between 1 and 20, preferably between 2 and 10.

The zeolites utilized in this invention are preferably incorporated or otherwise admixed with a matrix. Matrix materials are well known in the art and include inorganic oxides such as clay, silica, alumina, silica-alumina, etc. The matrix which is used is preferably non-catalytic—with alumina being particularly preferred.

As has heretofore been stated, the novel process of this invention resides in controlling the alpha value of the zeolites previously described prior to their use in a hydrodewaxing operation. In those situations where the acidic zeolite has an initial alpha activity in excess of 150, control of the alpha value can be achieved by reducing the initially high alpha activity down to the desired range by a wide variety of techniques. In this connection, it is known in the art that the alpha activity of a zeolite can be reduced by providing basic cations such as sodium in order to replace a portion of the cationic sites of the zeolites. Techniques of this type are described in U.S. Pat. No. 3,899,544 the disclosure of which is incorporated by reference. Thus, by way of specific illustration, if an acidic ZSM-5 zeolite had an initial alpha value in excess of 150, i.e. 177, a portion of its cationic sites could be replaced by sodium ions until its alpha activity was within the desired range.

Still another method of reducing the alpha activity is by partial coking of the catalyst. As is known in the art, when acidic zeolites are utilized for various hydrocarbon conversion processes a material deposits on the catalyst which is commonly referred to as coke. This material has a tendency to deactivate the zeolite and, as such, partial coking is an effective way of reducing the initially high alpha activity of the zeolite down to the desired levels.

Another technique which can be employed for the reduction of the initially high alpha activity would be to use the special class of zeolites in combination with an inert matrix either by using a catalyst particle which contains both matrix and zeolite or by using separate particles of both the zeolite and the matrix.

The preferred method for reducing the initially high activity of the special class of zeolites with which this invention is concerned is by steaming.

As has heretofore been pointed out, still another method of controlling the alpha activity of the zeolites is by manipulating the silica-to-alumina ratio of the zeolites within a certain range. In this connection, it is generally known in the art that the lower the aluminum content which is present in the crystal structure, the less places there are with which a cationic site can attach so that the alpha activity of zeolites is diminished. In this connection, the following correlation has been found between acid ZSM-5 having particular silica to alumina ratios and alpha values.

| Silica/Alumina Ratio of ZSM-5 | Alpha Value |
|---|---|
| 70 | 177 |
| 140 | 125 |
| 220 | 100 |
| 500 | 37 |

From the above, it can be seen that an unsteamed ZSM-5 zeolite having a silica to alumina ratio of 140 or 220 would satisfy the alpha value requirement while zeolites with a silica to alumina ratio of 70 or 500 would be outside the prescribed range. It is also to be understood that a combination of all the above techniques can be used. In this connection, it is specifically noted that a ZSM-5 zeolite having a silica to alumina ratio of about 220 has a corresponding alpha value of 100. As will be shown in Example 13, this zeolite does, indeed, provide an effective control of a hydrodewaxing operation in the unsteamed state. Still further improvement can be obtained if the material is steamed in accordance with the teachings of this invention.

The acidic zeolites, prior to steaming in accordance with the instant invention, have an alpha value in excess of 150 and steaming is carried out in order to reduce the alpha activity to the ranges previously set forth.

Preferably, steaming is carried out at elevated temperatures ranging from 300° F.–1500° F. at either atmospheric or elevated pressures. The steaming can be carried out in atmospheres of 100% steam or an atmosphere of steam and an inert gas.

If the catalyst is to be steamed in situ, it is expedient to use mixtures of steam and hydrogen at pressures from 50–200 psig and temperatures from 700°–900° F. for periods of time ranging from 1–48 hours. The exact reduction in alpha activity is a function of steam partial pressure, temperature and time. None of these variables is critical per se and the only requirement is that the steaming be carried out in order to obtain the critical range of alpha values.

For a nickel exchanged acid ZSM-5 (NiH/ZSM-5) steaming with a 50/50 mixture by volume of steam and hydrogen at 100 psig and 800° F. for 12–24 hours is satisfactory.

Following the treatment with steam, the nickel exchanged acidic ZSM-5 -type zeolite is preferably sulfided by treatment with a sulfiding compound such as hydrogen sulfide at elevated temperatures of about 450°–650° F.

The following examples will illustrate the novel process of this invention.

EXAMPLE 1

Catalyst Preparation

The catalyst used in the steaming studies was prepared by mixing a dried, as synthesized, ZSM-5 zeolite having a silica/alumina ratio of about 70 with alumina and water, extruding into 1/16" diameter pellets. The extruded material contained 65 parts ZSM-5 per 35 parts alumina.

The dried extrudate was calcined for three hours at 538° C. in flowing nitrogen. After cooling, the extrudate was contacted with an ammonium nitrate exchange solution (about 0.08 lb $NH_4NO_3$/lb extrudate) for one hour at ambient temperature. This exchange was then repeated until the sodium level was less than 0.05 wt %. The extrudate was then contacted with a nickel nitrate exchange solution (about 0.1 lb Ni $(NO_3)_2.6H_2O$/lb extrudate) for two hours at about 80°–90° C. After this exchange, the extrudate was washed, dried and calcined in a flowing gas mixture (approximately 10% air–90% nitrogen) at 538° C. for six hours. It was then determined to have an alpha value of 177.

EXAMPLE 2

The catalyst of Example 1 was treated with 100% steam for 16 hours at 1000° F. and 0 psig. It was then determined to have an alpha value of 22.

EXAMPLE 3

The catalyst of Example 1 was treated with 100% steam for 2 hours at 1000° F. and 0 psig. It was then determined to have an alpha value of 55.

EXAMPLE 4

The catalyst of Example 1 was treated with 100% steam for 3 hours at 900° F. and 0 psig. It was then determined to have an alpha value of 90.

EXAMPLE 5

The catalyst of Example 1 was treated with 100% steam for 6 hours at 850° F. and 0 psig. It was then determined to have an alpha value of 111.

EXAMPLE 6

The catalyst of Example 1 was treated with 100% steam for 4 hours at 850° F. and 0 psig. It was then determined to have an alpha value of 135.

EXAMPLE 7

The catalyst of Example 1 was treated with a 30/70 mixture by volume of steam and hydrogen for 6 hours at 800° F. and 100 psig. It was then calculated to have an alpha value of 145.

EXAMPLE 8

The catalyst of Example 1 was treated with a 40/60 mixture by volume of steam and hydrogen for 24 hours at 800° F. and 100 psig. It was then calculated to have an alpha value of 58.

EXAMPLE 9

The catalysts of Examples 1–6 were then evaluated for hydrodewaxing Nigerian gas oil after having been sulfided by treatment with hydrogen sulfide over a temperature range of 450°–650° F.

The hydrodewaxing was carried out at 400 psig, 1 LHSV, and 2500 $SCFH_2$/B and the results are shown in FIG. 1 wherein the temperature required for 0° F. pour point is plotted against time on stream. The approximate aging rate for the unsteamed catalyst of Example 1 (alpha 177) is also indicated by the solid line.

As can be seen, the required equilibration temperature was lowest for the catalyst of alpha 111 followed by the catalyst of alpha 90, followed by the catalyst of alpha 135, followed by alpha 55. The catalyst having an alpha value of 22 required the highest temperature.

The results of FIG. 1 are replotted in FIG. 3 to show the effect of alpha activity on equilibration temperature. As can be seen, optimum results are obtained within the range of 55–150 alpha. Better results are achieved at 80–135 alpha and even better results are achieved at 90–120 alpha. In addition, FIG. 3 also includes information in connection with steaming zeolites having silica to alumina ratios of 220:1 and 40:1. As can be seen, improved results are obtained. In this connection, the triangle in FIG. 3 represents a ZSM-5 zeolite having a silica to alumina ratio of 220:1. The broken line shows the decline in equilibration temperature as this material was steamed.

EXAMPLE 10

The catalysts of Examples 7–8 were evaluated for hydrodewaxing an Arabian Light 650°–775° F. gas oil after having been sulfided by treatment with hydrogen sulfide over a temperature range of 450°–650° F.

The hydrodewaxing was carried out at 400 psig, at an LHSV of 3.0, and 2500 SCF $H_2$/B and the results are shown in FIG. 2 where the temperature required to 0° F. pour point is plotted against days on stream.

EXAMPLE 11

The catalyst described in Example 7 and evaluated as described in Example 10, was subsequently regenerated in an air/nitrogen mixture to remove carbonaceous deposits. It was then further treated with a 40/60 mixture by volume of steam and hydrogen for 6 hours at 800° F. and 100 psig. After this treatment, it was calculated to have an alpha value of 84.

EXAMPLE 12

The catalyst of Example 11 was evaluated for hydrodewaxing by the procedure described in Example 10. The results are shown in FIG. 2 where temperature required for 0° F. pour point is plotted against days on stream.

As can be seen, the catalyst having an alpha value of 84 (Example 11) required the lowest temperature followed by the catalyst having an alpha value of 58 (Example 8). The catalyst of alpha 145 (Example 7) required the highest temperature.

The properties of the Nigerian and Arabian Light gas oils used in Examples 9 and 10 are shown in the following table.

TABLE 1

| | Nigerian Gas Oil | Arabian Light Gas Oil |
|---|---|---|
| Gravity, °API | 25.6 | 26.3 |
| Pour Point, °F. | +95 | +65 |
| Cloud Point, °F. | +94 | +68 |
| Hydrogen, % wt. | 12.67 | 12.40 |
| Sulfur, % wt. | 0.23 | 2.33 |
| Nitrogen, % wt. | 0.08 | 0.035 |
| CCR, % wt. | 0.04 | >0.01 |
| K.V. at 40° C., CS | 31.90 | 16.16 |
| Paraffins, % wt. | 30.9 | — |
| Naphthenes, % wt. | 33.2 | — |

TABLE 1-continued

|  | Nigerian Gas Oil | Arabian Light Gas Oil |
|---|---|---|
| Aromatics, % wt. | 35.9 | — |
| Distillation, °F. D1160 | | |
| IBP | 548 | 604 |
| 5% Vol | 671 | 685 |
| 10% Vol | 693 | 692 |
| 30% Vol | 721 | 706 |
| 50% Vol | 745 | 721 |
| 70% Vol | 771 | 738 |
| 90% Vol | 810 | 762 |
| 95% Vol | 824 | 770 |

EXAMPLE 13

This example will illustrate that effective control of alpha activity can be achieved by control of the silica to alumina ratio of the zeolite.

The catalyst used was prepared by mixing a dried, as synthesized, ZSM-5 zeolite having a silica to alumina ratio of about 220 with alumina and water, extruding into 1/16" diameter pellets. The extruded material contained 65 parts ZSM-5 per 35 parts of alumina.

The dried extrudate was calcined for three hours at 1000° F. in flowing nitrogen. After cooling, the extrudate was contacted with a 1 normal ammonium nitrate solution (about 5 cc per gram of extrudate) for one hour at ambient temperature. This exchange was repeated until the sodium level was less than about 0.05 weight percent. The extrudate was then dried at about 250° F. and then contacted with a 1 N nickel nitrate solution (5 cc/gm of extrudate) for four hours at 190° F. After this exchange, the extrudate was washed, dried and calcined in flowing air at 1000° F. for three hours. It was determined to have an alpha value of 100.

The above catalyst was then evaluated for the hydrodewaxing of Nigerian gas oil previously described and after about 10 days it equilibrated at a temperature of 775° F.

Thus, the above example shows that the improved hydrodewaxing operations can be carried out merely by controlling the silica to alumina ratio. It is to be understood, however, that it is possible to obtain even better results in some cases if a combination of techniques are used for the reduction of alpha values. In this connection, the data of Example 13 does appear at FIG. 3, previously described, and as can be seen this same material when steamed so as to reduce its alpha value to approximately 75 equilibrated at still a lower temperature.

What is claimed is:

1. In the process of hydrodewaxing a petroleum or synthetic hydrocarbon charge by contact of said charge and hydrogen at elevated temperatures and pressures with an acidic crystalline aluminosilicate zeolite having a pore diameter greater than about 5 Angstroms, a silica-to-alumina ratio of at least 12, and a constraint index within the range of 1-12 at elevated temperatures, the improvement which comprises treating said zeolite prior to use so as to adjust its alpha activity from a value in excess of 150 to within the range of 55-150 in order to enhance its catalytic properties.

2. The process of claim 1 wherein said acidic zeolite has a hydrogenation/dehydrogenation component associated therewith.

3. The process of claim 2 wherein said hydrogenation/dehydrogenation component is nickel.

4. The process of claim 1 wherein the initial alpha activity of said zeolite is reduced to an alpha value of 65-135.

5. The process of claim 1 wherein the initial alpha activity of said zeolite is reduced to an alpha value of 90-120.

6. The process of claim 1 wherein a ZSM-5 type zeolite is used.

7. The process of claim 2 wherein a ZSM-5 type zeolite is used.

8. The process of claim 3 wherein a ZSM-5 type zeolite is used.

9. The process of claim 4 wherein a ZSM-5 type zeolite is used.

10. The process of claim 5 wherein a ZSM-5 type zeolite is used.

11. The process of claim 6 wherein the zeolite is ZSM-5.

12. The process of claim 7 wherein the zeolite is ZSM-5.

13. The process of claim 9 wherein the zeolite is ZSM-5.

14. The process of claim 10 wherein the zeolite is ZSM-5.

15. The process of claim 6 wherein the zeolite is ZSM-11.

16. The process of claim 7 wherein the zeolite is ZSM-11.

17. The process of claim 9 wherein the zeolite is ZSM-11.

18. The process of claim 10 wherein the zeolite is ZSM-11.

19. The process of claim 1 wherein the reduction of alpha activity is accomplished by steaming said zeolite prior to use.

20. The process of claim 1 wherein the reduction of alpha activity is accomplished by control of the silica to alumina ratio of said zeolite.

21. The process of claim 1 wherein the reduction of alpha activity is accomplished by base exchange with alkali metal cations.

22. In the process of hydrodewaxing a petroleum or synthetic hydrocarbon charge by contact of said charge and hydrogen at elevated temperatures and pressures with acid crystalline aluminosilicate zeolite ZSM-5 wherein said zeolite is contacted with steam prior to use in order to enhance the catalytic properties, the improvement which comprises carrying out said steaming until said zeolite has an alpha value of 55-150.

23. The process of claim 22 wherein said acid ZSM-5 has a hydrogenation/dehydrogenation component associated therewith.

24. The process of claim 23 wherein said hydrogenation/dehydrogenation component is nickel.

25. The process of claim 22 wherein steaming is carried out until said zeolite has an alpha value of 80-135.

26. The process of claim 22 wherein steaming is carried out until said zeolite has an alpha value of 90-120.

* * * * *